INVENTORS
SHIH YING LEE
YAO TZU LI

May 3, 1966 SHIH Y. LEE ETAL 3,248,936
TEMPERATURE COMPENSATED TRANSDUCER
Filed Dec. 21, 1960 5 Sheets-Sheet 3

INVENTORS
SHIH YING LEE
YAO TZU LI
BY
Kenway, Jenney & Hildreth
ATTORNEYS

INVENTORS
SHIH YING LEE
YAO TZU LI
BY
Kenway, Jenney & Hildreth
ATTORNEYS

United States Patent Office 3,248,936
Patented May 3, 1966

3,248,936
TEMPERATURE COMPENSATED TRANSDUCER
Shih Y. Lee and Yao T. Li, both of Huckleberry Hill, Lincoln, Mass.
Filed Dec. 21, 1960, Ser. No. 77,364
27 Claims. (Cl. 73—141)

This invention relates to force sensing transducers of the type normally having a sensitivity which varies with temperature, as well as temperature induced zero-shift characteristic, and more particularly, to a novel improvement in such a transducer whereby the temperature induced change in sensitivity and zero-shift of the transducer is eliminated, or at least substantially eliminated.

An exemplary transducer which has a sensitivity which varies with temperature is the electrical strain gage transducer. A strain gage transducer, conventionally, utilizes strain gages connected in a Wheatstone bridge so that the ratio of bridge output voltage to bridge excitation voltage will vary as a function of the strain or deflection of the strain gages. The input force to the transducer may be supplied by various means, for example, a fluid pressure responsive bellows. The input force is suitably coupled to the deflectable strain gages so that changes in the input force will result in changes in the deflection of the gages, and thus, changes in the resistance of the strain gages. Thus, the strain gage bridge voltage ratio will be a measure of the fluid pressure sensed by the bellows. However, the relationship of bridge voltage ratio to strain is affected when the strain gage material is temperature sensitive. The term "temperature sensitive," as applied to strain gage material, is used here to define strain gage material, the resistance and gage factor of which varies with temperature. The gage factor of a strain gage is defined as the ratio of percent change of resistance and percent change of strain. Thus, with temperature sensitive strain gage materials, the strain gage bridge voltage ratio will vary with the temperature of the strain gage material as well as with the strain thereof; and more importantly, the rate of change of the bridge voltage ratio as a function of strain, or in other words, the sensitivity of the bridge, will vary with temperature. The sensitivity of the bridge is defined as the rate of change of bridge voltage ratio as a function of strain. Certain semi-conductor materials; namely, silicon and germanium, have been found to have the characteristic of piezo resistivity, so that they may be used as strain gage materials. However, these semi-conductor materials are particularly temperature sensitive. For example, their use in a strain gage bridge may result in a bridge sensitivity change of as much as 25% for each 100° F. change in temperature. Also, where these semi-conductor materials are used as strain gage material, the change in bridge sensitivity is inversely related to the change in temperature.

It is the primary object of this invention to provide a novel and improved means for eliminating temperature induced change in sensitivity for force sensing transducers which normally have such a change in sensitivity.

It is a particular object of this invention to provide a novel and improved strain gage transducer which, while utilizing temperature sensitive strain gage material, does not have a temperature induced variation in sensitivity.

It is another object of this invention to provide a temperature compensated transducer in which any temperature induced zero-shift is also eliminated.

It is a further object of this invention to provide a novel and improved temperature compensated force sensing transducer, the temperature compensation of which is accomplished mechanically.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

FIG. 11b is a cross sectional view substantially along the line 11b—11b of FIG. 11a;

Figure 1:
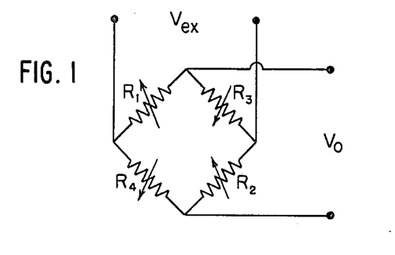
FIG. 1 is a schematic diagram of an exemplary strain gage bridge.
Figure 2:
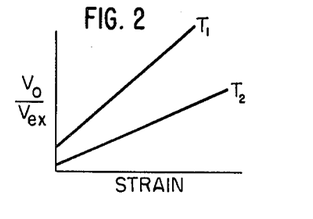
FIG. 2 is an exemplary graph illustrating the change in sensitivity with temperature of a strain gage bridge utilizing semi-conductor or other type strain gage material.
Figure 3:
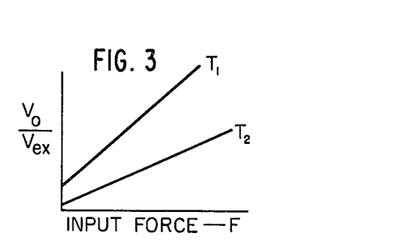
FIG. 3 is an exemplary graph illustrating the temperature induced change in the relationship of bridge voltage ratio to input force in a transducer utilizing temperature sensitive strain gage material.

With reference to FIG. 1 of the drawings, there is shown an exemplary electrical resistance strain gage bridge. The four resistances $R_1$ to $R_4$ represent strain gages coupled to a movable input member of a force sensing transducer. The input force which it is desired to measure is coupled to the input member of the force sensor to move the same and deflect the strain gages. As the input member is deflected in one direction, the gages $R_1$ and $R_2$ will be in tension, and the gages $R_3$ and $R_4$ will be in compression. The attendant change in the resistance of the gages will, of course, result in a change in the ratio of the bridge output voltage, $V_o$, to the bridge excitation voltage, $V_{ex}$. The change in the bridge voltage ratio provides an indication of the change in strain or deflection of the gages, and thus a measure of the input force. As previously mentioned, some strain gage materials are temperature sensitive, in that their gage factor varies with temperature. The change of sensitivity can also be caused by other factors such as a change of elastic modulus, with temperature, of the supporting structure for the gage. In FIG. 2 is a typical graph showing voltage ratio $V_o/V_{ex}$ vs. strain for two environmental temperatures for an uncompensated strain gage force transducer. As can be seen from this graph, the slope of the curve (rate of change of $V_o/V_{ex}$ as a function of strain) at a temperature $T_1$ is substantially different from the slope of the curve at a second high temperature $T_2$. In other words, the sensitivity of the bridge is substantially different at these temperatures. Also, the zero point of the curve for $T_2$ is shifted from the zero point of the curve of $T_1$. This may be due to various factors, for example, a temperature induced change in resistance of the gages of the bridge which varies from one arm of the bridge to another. Also, it is to be noted that when semi-conductor materials are used as the strain gage material, the sensitivity of the bridge is less at the high temperature $T_2$. With reference to FIG. 3, it can be seen that the bridge voltage ratio $V_o/V_{ex}$ will vary as a function of input force F to the transducer in substantially the same manner that the bridge voltage ratio varies as a function of strain of the gages. Also, the slopes of the curves of FIG. 3 will vary with temperature in substantially the same manner as the slopes of the curves of FIG. 2. This is because for most elastic materials the change of modulus of elasticity with temperature is quite small, and the strain is proportional to the force for all temperatures.

Figure 4:
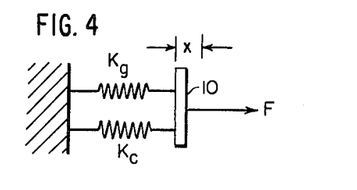
FIG. 4 is a schematic representation of a strain gage transducer embodying one aspect of the present invention.
Figure 5:
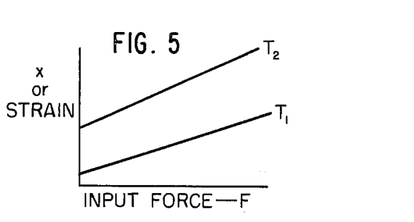
FIG. 5 is an exemplary graph of the relationship of temperature, input force, and strain or displacement of a strain gage transducer embodying the present invention.

With reference to FIG. 4, an exemplary strain gage transducer 10 is represented diagrammatically. As is believed apparent, such a transducer has a mechanical stiffness which affects the value of $V_o/V_{ex}$ for a given value of applied force. The stiffness is represented by a spring Kg. The temperature induced change in gage factor of the transducer, particularly in the case where semi-conductor strain gage materials are used, is sufficiently large with respect to any temperature induced change in Kg, that the latter can be disregarded as regards its affect on the bridge voltage ratio $V_o/V_{ex}$. Therefore, let us assume that the stiffness Kg is a constant. In accordance with the invention, a second "spring," having a stiffness Kc, is connected in parallel with the spring Kg. In accordance with the invention the spring Kc is temperature sensitive, or in other words, its spring rate varies with temperature. Thus, the resulting stiffness (Kg+Kc) of the transducer will also vary with temperature. When the input force F is applied to the device in the direction shown in FIG. 4, a displacement X of the input member will result. This displacement X is directly related to the strain or deflection of the strain gages. Thus, as shown in FIG. 5, the rate of change of displacement of the input member, or strain of the gages, as a function of input force F, will also vary with temperature.

Figure 6:
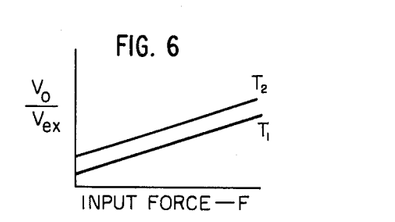
FIG. 6 is an exemplary graph illustrating the sensitivity of a strain gage transducer embodying one aspect of the present invention.

The spring Kc of FIG. 4 is constructed and arranged to provide the transducer with a spring rate and thus stiffness which decreases with increases in temperature. As shown in FIG. 5, the slope of the curve at $T_1$ will be less than at the higher temperature $T_2$. It will be understood that if the sensitivity of the transducer normally increased with temperature the spring Kc would be constructed and arranged to provide a transducer stiffness which increased with temperature. As will be explained hereinafter, by adjusting the initial spring rate of the spring Kc at a reference temperature, the relationship of input force to the bridge voltage ratio may be made to be as shown in FIG. 6. As can be seen from FIG. 6, any temperature induced changes in transducer sensitivity have been eliminated.

Figure 9:
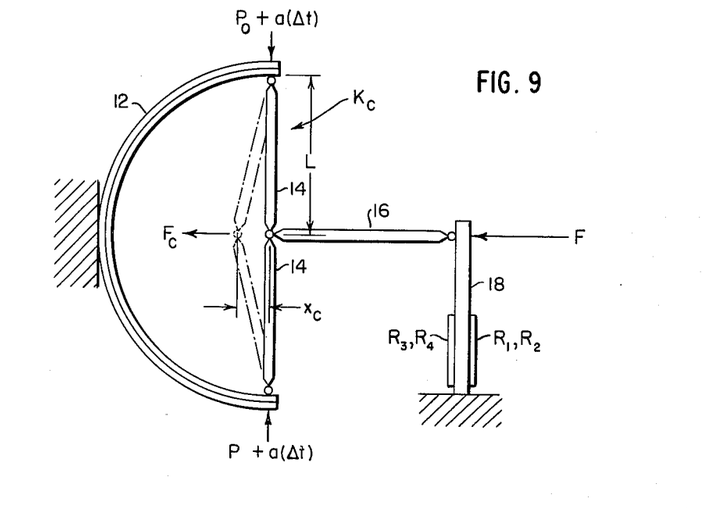
FIG. 9 is a diagrammatic representation of a temperature compensated strain gage transducer embodying the present invention.

With reference to FIG. 9, an exemplary compensating spring Kc of this invention comprises a C-shaped bimetal spring 12, the ends of which will be displaced toward or away from each other in response to changes in temperature. The spring Kc further comprises a pair of rigid links 14 of equal length hinged together at one end. The other ends of the links are hingedly connected to the ends of the spring 12. The midpoint of the linkage is hingedly connected to one end of a rigid link 16 which extends in a direction bisecting the C-shaped spring 12. The other end of the link 16 is hingedly connected to a cantilever supported strain gage beam or input member 18 adjacent the free end thereof. The beam 18 mounts strain gages $R_1$ and $R_2$ on one side thereof, and strain gages $R_3$ and $R_4$ on the other side thereof. With the transducer input force F applied to the beam 12 in the direction indicated in FIG. 9, the beam will be bent toward the compensating spring Kc, and the gages will be deflected so that the gages $R_1$, $R_2$ will be under tension while the gages $R_3$, $R_4$ will be under compression. As can be seen from FIG. 9, a force directed longitudinally of the link 16 will tend to cause the outer ends of the links 14 to be displaced toward or away from each other while the center of the linkage will be displaced in a direction extending at right angles to the aligned links. The links 14 thus act in the manner of toggle linkage. As will be seen hereafter, various structures may be substituted for the links 14 to achieve the same result. In the interest of simplicity, the links 14 and structures substituted therefor will be referred to as toggles or toggle-like structures.

The spring 12, at a reference temperature, will exert a force $P_o$ which may be directed inwardly or outwardly of the aligned links 14. At any other temperature the force exerted by each end of the spring will be $$P_o + a(\Delta t) \qquad (1)$$

where $a =$ a constant dependent upon the dimensions and properties of the bimetal spring 12. This constant may be positive or negative in sign. For reasons which will be apparent, this constant is positive in the embodiment of FIG. 9 so that as temperature increases, the tendency of the spring ends to be moved toward each other will increase.

$\Delta t =$ the change in temperature of the spring 12.

When the center of the links 14 is displaced from its dead center position by an amount $X_c$, the spring Kc exerts a force $F_c$ on the link 16 and thus the beam 18. Where the displacement $X_c$ of the center of the toggle is quite small (e.g. 1/100) compared to the distance L from each end of the spring 12 to the longitudinal centerline of the link 16, or line of action of the spring Kc, $F_c$ may be expressed $$F_c = \frac{2[P_o + a(\Delta t)]X_c}{L} \qquad (2)$$

The spring constant, $$F_c/X_c$$

of the "spring" Kc thus $$= -\frac{2[P_o + a(\Delta t)]}{L} \qquad (3)$$

The negative sign in the spring constant is utilized because the spring 12 tends to urge the toggle center away from dead center position. By reversing the direction of the force $P_o$, Kc will then become a positive spring. It has been found that either a negative or positive spring Kc will perform satisfactorily. However, in the embodiment of FIG. 9 utilizing a negative spring Kc, there is the advantage that the resultant spring constant, Kg−Kc, of the transducer is less than original spring constant $Kg$ of the uncompensated transdurcer. Thus, the applied force F required to deflect the beam 18 is reduced with an attendant improvement in the sensitivity of the transducer. This is desirable in measuring very small forces. It should be noted that $Kg-Kc$ should not be made to approach closely to zero as in that event the hysteresis of the system becomes poor.

As will seen from FIG. 9 and Equation 3, a rise in temperature will result in an increase in the spring rate of the spring $Kc$ which will result in a decrease in the total spring rate, and thus stiffness, of the transducer. For a given applied force F there will thus tend to be an increased deflection of the beam 18 for an increase in temperature. It will be recalled that the gage factor of the gabes $R_1$, $R_2$, $R_3$, and $R_4$ decreased with a rise in temperature. It has been found that by proper adjustment of the initial force $P_o$, of the spring $Kc$, the decrease in stiffness of the transducer, as a result of the temperature induced action of the spring $Kc$, will eliminate the temperature induced decrease in bridge sensitivity brought about by the varying gage factor of the strain gages. As a result, the plot of bridge voltage ratio vs. applied force F will be as shown in FIG. 6. This is proven by the following:

The combined stiffness of the strain gage beam 18 and the temperature compensation spring $Kc$ $$= Kg - \frac{2[P_o + a(\Delta t)]}{L} \quad (4)$$

The deflection of the strain gage beam due to an input force F is $$\delta = \frac{F}{Kg - \frac{2[P_o + a(\Delta t)]}{L}} \quad (5)$$

The output of the strain gages is a function of the strain gage beam deflection, which is proportional to strain, as well as to temperature. Thus, assuming that the curves of FIG. 2 both originate at zero $$\frac{V_o}{V_{ex}} = S\delta[1 - b(\Delta t)] \quad (6)$$

where $S$ = the sensitivity of the strain gage bridge at 0° F., and
$b$ = the temperature coefficient of sensitivity of the bridge.

Combining Equations 5 and 6

$$\frac{V_o}{V_{ex}} = S[1 - b(\Delta t)] \frac{F}{Kg - \frac{2[P_o + a(\Delta t)]}{L}} \quad (7)$$

$$= \frac{SF[1 - b(\Delta t)]}{Kg - \frac{2P_o}{L} - \frac{2a\Delta t}{L}} \quad (8)$$

$$= \frac{[1 - b(\Delta t)]}{\left(Kg - \frac{2P_o}{L}\right)\left[1 - \frac{2aL(\Delta t)}{L(KgL - 2P_o)}\right]} \quad (9)$$

$$= \frac{SF[1 - b(\Delta t)]}{\left(Kg - \frac{2P_o}{L}\right)\left[1 - \frac{2a(\Delta t)}{KgL - 2P_o}\right]} \quad (10)$$

From Equation 10 is can be seen that the temperature induced effect or stiffness of the transducer is zero when $$\frac{2a}{KgL - 2P_o} = b \quad (11)$$

or when $$P_o = \frac{KgL}{2} - \frac{a}{b} \quad (12)$$

Thus, by adjusting $P_o$ so that Equation 12 is satisfied, the temperature induced sensitivity change of the strain gage bridge may be eliminated.

Figure 10:
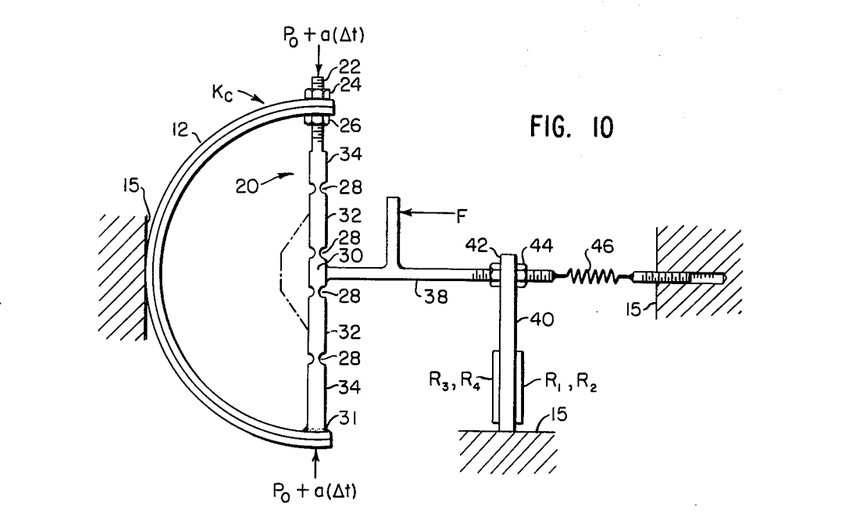
FIG. 10 is a diagrammatic representation of a temperature compensated strain gage transducer embodying additional aspects of this invention.

With reference to FIG. 10, there is shown, diagrammatically, a temperature compensated strain gage transducer having provisions, for eliminating temperature induced changes in bridge sensitivity, for eliminating zero-shift in bridge voltage ratio as a result of temperature changes, and for zeroizing so that at zero applied force the value of $V_o/V_{ex}$ will be at zero. The transducer of FIG. 10 includes a temperature sensitive spring $Kc$ comprising the bimetal spring 12 previously described and a flexure member or bar 20 which extends between the ends of the spring 12. One end 21 of the flexure bar 20 is fixed to one end of the spring. The other end 22 of the flexure bar is threaded and extends through an opening in the other end of the spring 12. A pair of nuts 24, 26 disposed on opposite sides of this end of the spring 12 are threadably engaged with the threaded end 22 of the flexure bar. By adjusting the nuts, the spring 12 may be selectively adjusted to vary the initial tension or force $P_o$ of the spring 12. In this manner, the initial spring rate of the spring $Kc$ is adjusted.

Figure 7:
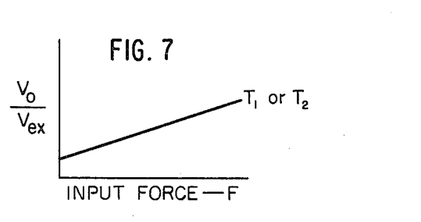
FIG. 7 is an exemplary graph illustrating the relationship of strain gage bridge voltage ratio to input force in a transducer embodying a further aspect of this invention.

The flexure bar 20 is reduced in cross section, or weakened, at several points intermediate its ends to provide a plurality of frictionless hinge-like portions 28 spaced apart longitudinally along the bar. These hinge portions separate the bar into a center link 30, a pair of links 32 on opposite sides of the center link, and a pair of links 34 on opposite sides of the links 32. The flexure bar thus, in effect, provides a toggle linkage in that when the spring 12 exerts an inward force on the bar from the end thereof, the links 32 and the center link 30 will tend to be displaced off center, for example, as shown by the broken lines in FIG. 10. The center link 30 is connected to one end of a rod or drive member 38. The other end of the rod 38 is connected to a cantilever supported strain gage beam 40 which mounts the gages $R_1$–$R_4$ in the same manner as described in connection with FIG. 9. In accordance with the invention, the end of the rod 38 is threaded and extends through an opening in the beam. A pair of nuts 42, 44 are threadably engaged with the end of the rod and about opposite sides of the beam. As will be apparent from FIG. 10, adjustment of the nuts 42, 44 will vary the effective length of the link 38. By varying the effective length of the link 38, there will be an initial deflection of the toggle and the beam 40 at zero input force and at the reference temperature. Rather, the beam 40 and the spring $Kc$ will be initially deflected by an amount determined by the relative stiffness of these elements and the value of the change in length of the link 38. It has been found that by proper adjustment of the length of the link 38, the spring $Kc$ may be made to have a deflection which varies as a function of temperature in a manner so as to offset any temperature induced zero-shift in bridge voltage ratio. Zero-shift may be caused by various factors including unequal temperature induced resistance change in the arms of the bridge, differential expansion of supporting structure, etc. In this manner, the resultant plot will be a single curve as shown in FIG. 7. This can be shown as follows:

From the Equation 3

$$Kc = K_S + j(\Delta t) \quad (13)$$

where $$K_S = \frac{-2P_o}{L}$$

and $$j = \frac{-2a}{L}$$

If the length, $l$, of the link 38 is increased by $\Delta l$, the relationship of the initial deflection of $\delta i$ of the beam 40 and the initial deflection of $\Delta X$ of the spring $Kc$ will be $$\delta i K_g = (\Delta X) Kc \qquad (14)$$

since $\Delta X = \Delta l - \delta i$, then $$\delta i = \frac{(\Delta l - \delta i) Kc}{Kg}$$

$$= \frac{\Delta l Kc - Kc \delta i}{Kg}$$

and $$\delta i = \Delta l \frac{Kc}{Kc + Kg} \qquad (15)$$

From Equations 13 and 15

$$\delta i = \Delta l \frac{(K_s + j \Delta t)}{(K_s + K_g) + j \Delta t} \qquad (16)$$

$$= \frac{K_s}{K_s + Kg} \Delta l \frac{\left(1 + \frac{j}{K_s} \Delta t\right)}{1 + \frac{j}{K_s + Kg} \Delta t}$$

$$= \frac{K_s}{K_s + Kg} \Delta l \left(1 + \frac{j}{K_s} \Delta t\right) \left\{1 - \frac{j}{K_s + Kg} \Delta t + \left(\frac{j}{K_s + Kg}\right)^2 (\Delta t)^2 + \ldots\right\}$$

$$= \frac{K_s}{K_s + Kg} \Delta l \left\{1 + \left(\frac{j}{K_s} - \frac{j}{K_s + Kg}\right) \Delta t + \left[\left(\frac{j}{K_s + Kg}\right)^2 - K_s \frac{j^2}{(K_s + Kg)^2}\right] (\Delta t)^2 + \ldots\right\}$$

$$= \frac{K_s}{K_s + Kg} \Delta l \left\{1 + \frac{Kg}{K_s(K_s + Kg)} j \Delta t - \frac{Kg}{K_s(K_s + Kg)^2} j^2 (\Delta t)^2 + \ldots\right\} \qquad (17)$$

If we neglect the higher order terms, then $\delta i$ may be expressed as $$\delta i = \frac{K_s}{K_s + Kg} \Delta l \left\{1 + \frac{Kg}{K_s(K_s + Kg)} j(\Delta t)\right\} \qquad (18)$$

From Equation 18 it is seen that the zero-force deflection $\delta i$ is a function of temperature and $$\frac{\delta i}{\Delta t} = \frac{Kgj}{(K_s + Kg)^2} \Delta l \qquad (19)$$

Thus, it can be seen that initial deflection of the beam 40 may be made to vary as a function of temperature by varying the length of the link 38. The output ($V_o/V_{ex}$) of the transducer is proportioned to the deflection of the beam 40.

$$\frac{V_o/V_{ex}}{\Delta t} \simeq \frac{Kgj}{(K_s + Kg)^2} \Delta l \qquad (20)$$

Thus, the errors in transducer output due to temperature induced changes in resistance of the strain gage material, or due to any other reasons, are eliminated by proper adjustment of $\Delta l$. From Equation 20 it can be seen that, theoretically, the rate of change of $V_o/V_{ex}$ with change in temperature will be zero when $\Delta l$ is zero. However, in actual practice various errors such as unequal temperature coefficients of resistance of the strain gages may result in temperature induced errors in $V_o/V_{ex}$ when there is no deflection of the beam 40. This error in transducer output may be represented as a corresponding deflection of the strain gages. Thus, this output error may be offset by a corresponding, but opposite, deflection of the beam 40 so that the output of the transducer will remain constant with respect to temperature. This may be accomplished by introducing a $\Delta l$ of proper value and at zero applied load at a reference temperature so that the deflection of the beam 40 may be made to change as a function of temperature in a manner which will compensate for zero-shift.

Figure 8:
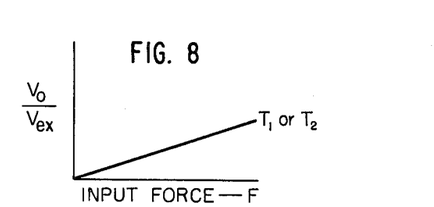
FIG. 8 is an exemplary graph illustrating the relationship of strain gage bridge voltage ratio and input force in a transducer embodying still another aspect of this invention.

As will be apparent from the foregoing, the provision of an initial deflection of the spring $Kc$ and beam 40 in order to eliminate the zero-shift, will result in a bridge output signal at the no load or reference load condition and at the reference temperature. The transducer of FIG. 10 also includes means for adjusting the output of the transducer at the reference temperature so that at zero applied load the output of the transducer will be zero, as shown in FIG. 8. With reference to FIG. 10, a spring 46 is connected at one end to the threaded end of the rod 38. The other end of the spring 46 is connected to an adjusting member 48 threadably mounted on the frame 15. The spring rate of the spring 46 is substantially constant with respect to temperature. By adjusting the member 48 toward and away from the beam 40, the spring 46 may be adjusted to provide a force which will center the beam 40 so that at the reference temperature the bridge voltage ratio will be zero when the applied or reference load is zero.

From the above it can be seen that there has been provided a novel and improved temperature compensated transducer wherein the compensation is accomplished by means mechanically acting directly on the transducer. The output of the transducer is thus temperature compensated without resort to external electrical networks or the like which will reduce the magnitude of the resulting signal, and introduce nonlinearity in the system. In accomplishing the compensation of the transducer of FIG. 10, the adjustment of the initial spring rate of the spring $Kc$ should first be done. Next, the adjustment of the effective length of the link 38 to introduce the proper $\delta i$ should be accomplished; and finally, the zeroizing adjustment of the spring 46 should be done. It is necessary that the steps be followed in this sequence in order to assure accurate compensation.

The temperature compensation of a force sensing transducer has been thus far described in connection with the specific embodiments of FIGS. 9 and 10 wherein a bi-metal spring and a toggle arrangement acts on a strain gage beam. However, this invention also contemplates other arrangements for providing a temperature compensated strain gage transducer. Further, this invention contemplates the temperature compensation of force sensing transducers other than strain gage transducers; by way of example, and not limitation, this invention may be applied to E-core type transducers. As will be apparent, this invention includes within its scope, and is applicable to any force sensing transducer of the type wherein the rate of change of output of the transducer as a function of input force varies with temperature; wherein the transducer includes a deflectable member coupled to the input of the transducer for deflection in response to changes in input; wherein the output of the transducer varies as a function of the deflection of the deflectable member; and wherein the deflection of said deflectable member by the input force is resisted by a force which varies with the deflection of the deflectable member so that the transducer may be said to have a stiffness and a spring rate. As will be apparent hereinafter, the deflectable member may be an input member such as the strain gage beam 40 of FIG. 10, the strain gage itself, or it might be the armature of an electrical transducer such as an E-core type transducer. In any case, the output of the transducer will vary as a function of the relative position or deflection of the deflectable member.

As noted above, the temperature compensating means of this invention, in its basic aspect, varies the stiffness of the transducer as a function of temperature. Such compensating means may therefore be of any type which will provide a spring-like force at a spring rate which varies with temperature. The compensating means may be constructed to have an initial spring rate which is proper for a particular transducer. However, it is preferred to provide some means for adjusting the initial spring rate so that accurate compensation can be accomplished. The term "spring force" is used herein to define any force which varies as a function of displacement, and the term "spring rate" is used herein to define the rate of change of force as a function of displacement. Springs, of course, inherently provide such a force and have such a rate of change of force. However, as will be hereinafter seen, other devices and structures may be utilized to provide such a force or rate of change of force, and thus, will be said to provide a "spring force" and having a spring rate. Correspondingly, structures other than those involving conventional springs may be utilized to provide a spring force and spring rate which varies as a function of temperature. It will be apparent that this invention includes all such structures within its scope. By way of examples of the various transducers and temperature compensating means contemplated, certain of such devices will now be described, it being understood that these examples are not to be taken as limiting the invention but only as illustrative of the scope thereof.

Figure 11:
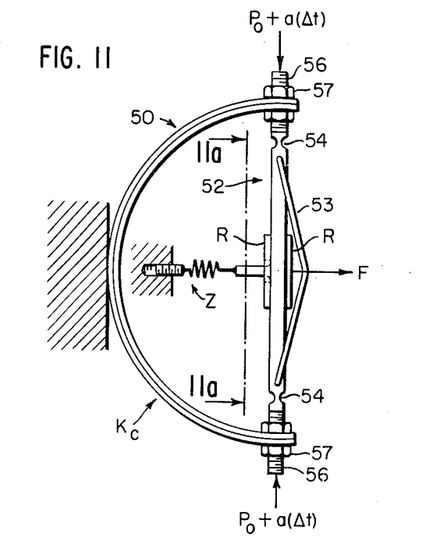
FIG. 11 is a diagrammatic representation of a strain gage transducer similar to that of FIG. 9 but of modified construction.
Figure 11A:
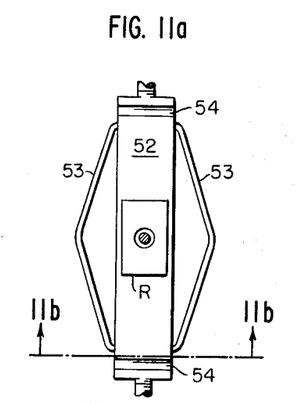
FIG. 11a is a cross sectional view substantially along the line 11a—11a of FIG. 11.
Figure 11B:
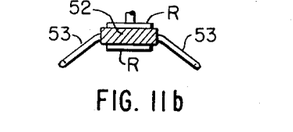

With reference to FIG. 11, there is shown a temperature compensated transducer of the strain gage type utilizing a C-shaped bimetal spring 50 which corresponds to the spring 12 of FIG. 10. A flexible resilient member 52 extends between the ends of the spring 50. The member 52 has a pair of reduced cross section portions 54 adjacent its ends, respectively, facilitating bowing of the center portion of the member 52. The ends 56 of the member 52 are threaded and a pair of nuts 56 are engaged therewith on the outside of the spring 50 for the purpose of adjusting the initial spring rate of the temperature compensating spring $Kc$ formed by the spring 50 and member 52. Strain gages R are bonded to opposite sides of the member 52. As can be seen from FIG. 11, an applied force F directed at right angles to the end point of the member 52 will result in a bowing of the middle portion thereof. The ends of the members, because of the flexure or hinge portions 54, will tend to remain in alignment. The bimetal spring 50 exerts a force directed longitudinally inwardly of the member 52. This force will vary as a function of temperature. Thus, the bending stiffness of the member 52 will be varied with temperature. As will be apparent, the transducer of FIG. 11 is similar to that of FIG. 10 except that the strain gages are mounted on the toggle-like member 52 of the temperature compensating spring. Thus, the input member 40 and toggle linkage 20 of FIG. 10 are combined into one member in the temperature compensated transducer of FIG. 11. In the transducer of FIG. 11, temperature compensating for zero-shift due to changes in the strain gage resistance with temperature is accomplished by providing an initial deflection of the compensating spring and strain gages as in the case of the transducer of FIG. 10 but in a different manner. With reference to FIGS. 11, 11a, and 11b, a pair of wire members 53 are mounted at their ends on the deflectable portion of the member 52. The wires 53 have a generally V-shaped configuration and the ends of the wires are fixed to the member 52 adjacent the hinge portions 54. By bending the wires to one side or the other of the general plane of the member 52, the center of gravity of the member 52 may be moved relative to the hinge portions 54, when the hinges are not aligned with the center of gravity of the member 52, the force $P_0$ will cause an initial deflection of the member 52. This initial deflection can be controlled by the amount of bending of the wires 53 out of the general plane of the member 52. The direction of the initial deflection is, of course, controlled by the direction of bending of the wires 53. Thus, by deforming the wires 53 in the correct amount to satisfy Equation 20, temperature induced zero-shift will be eliminated.

As will be apparent from the above, another cause of zero-shift might be an initial misalignment of the hinge 54 and center of gravity of the member 52 due to manufacturing tolerances. The adjustment of the wires 53 will, of course, provide compensation for zero-shift regardless of its cause. The zero-shift compensating wires need not be V-shaped, as shown, but may be of varying configuration. They should, however, have a substantial portion thereof spaced laterally outwardly of the member 52 when the zero-shift compensating members lie in the plane of the member 52. Thus, when they are deformed to one side of the general plane of the member 52, the center of gravity of the member 52 will be shifted. The zero-shift compensation could be accomplished in other ways, for example, by adding mass to one side of the member 52. The zeroizing of the transducer of FIG. 11 is provided by the adjustable spring means Z similar to the zeroizing means of the transducer of FIG. 10.

Figure 12:
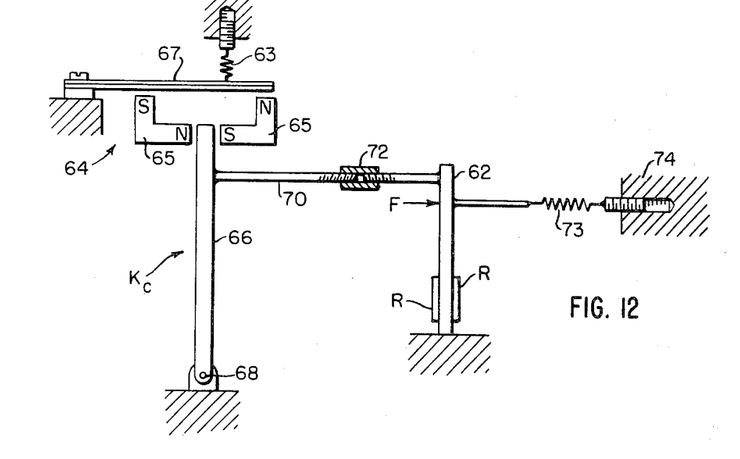
FIG. 12 is a diagrammatic representation of a strain gage transducer incorporating another aspect of the present invention.

With reference to FIG. 12, there is shown another embodiment of temperature compensating means which does not utilize a mechanical spring. In the embodiment of FIG. 12, the compensating spring $Kc$ comprises a permanent magnet structure 64 including a pair of magnets 65 having unlike poles spaced apart on opposite sides of one end of an armature 66. The other end of the armature 66 is pivoted as at 68. As seen in FIG. 12, the other poles of the magnets 65 are bridged by a bimetal member 67. The bimetal 67 is supported in cantilever fashion so that a change in temperature will result in a variation of the air gap between the bimetal 67 and the magnets 65. With the free end of the armature 66 centered between the poles of the magnets 65 there will be equal magnetic forces tending to attract the armature in opposite directions about its pivotal axis. However, as the armature is moved toward one magnet or the other, this force will increase on one side of the armature, and decrease on the other side so that the magnet will tend to be moved into contact with the closest magnet. For small movements of the armature, the variation in magnetic force will be substantially linear, and this force will vary with displacement of the armature. This force may thus be said to be a spring force and may be said to have a certain spring rate. The temperature induced variations in the gap between the bimetal 67 and the magnets 65 will result in a variation of the magnetic force on the armature. Thus, the spring $Kc$ is temperature sensitive in that it will have a spring rate which varies with temperature. The initial spring rate of the spring case is set by adjusting the spacing of the bimetal 67 from the magnets 65. Suitable adjustable spring means 63 may be provided for this purpose.

The free end of the armature 66 is connected by a link 70 to a strain gage beam 62 mounting strain gages R. A turnbuckle in the link 70 permits adjustment of the initial deflection of the armature 66 and beam 62 to compensate for zero-shift in transducer output. A spring 73 biases the beam 62, and adjustable means 74 are provided for varying the preloading of the spring 73 to zeroize the transducer.

Figure 13:
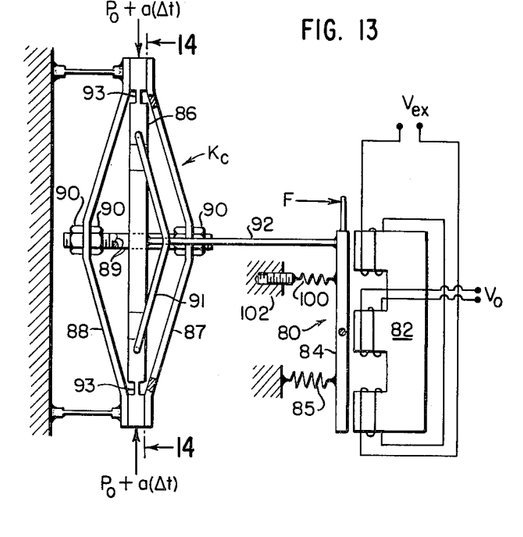
FIG. 13 is a diagrammatic representation of another type of force sensing transducer incorporating a further aspect of this invention.
Figure 14:
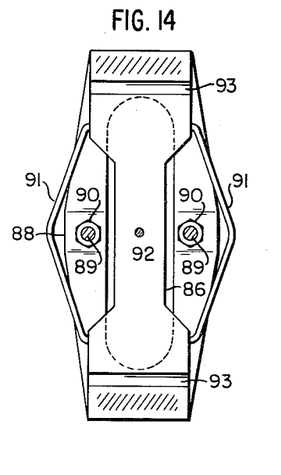
FIG. 14 is a cross sectional view substantially along the line 14—14 of FIG. 13.

With reference to FIGS. 13 and 14, the transducer comprises a force sensor in the form of an E-core pickoff 80 including a stator 82 and armature 84. The armature is pivoted intermediate its ends and suitable spring means 85 are provided to center the armature relative to the end poles of the stator. The temperature compensating means $Kc$ comprises an elongated resiliently flexible member or beam 86. Disposed on opposite sides of the beam 86 are a pair of bow-shaped members 87, 88. The ends of the members 87, 88 are fixed to the ends of the beam 86. The two bow-shaped members are fabricated of the same material, preferably a metal, and have a temperature coefficient of linear expansion which is substantially different from that of the beam 86 which also is preferably fabricated from a suitable metal. In the specific embodiment of FIGS. 13 and 14, the members 87, 88 will expand lengthwise with a rise in temperature at a rate which is substantially less than the rate of linear expansion of the beam 86. Accordingly, with a rise in temperature, the differential rate of expansion of the beam 86 and members 87, 88 will result in an increase in force directed longitudinally of the beam 86 inwardly from its ends. This force is equivalent to that imposed by the C-spring 50 of FIG. 11. In this manner, the bending stiffness of the member 86 will be varied with temperature. In order to provide adjustment of the initial spring rate of the compensating means $Kc$, there is provided a pair of bolts 89 which extend on opposite sides of the beam and through apertures in the members 87, 88. A pair of nuts 90 are engaged with each end of each bolt 89 and abut opposite sides of one of the bar members. As will be apparent the force $P_o$ directed longitudinally of the beam 86 may be varied by adjusting the nuts 90 to vary the initial bowing of the members 87, 88. As shown in FIGS. 13 and 14, a pair of V-shaped wires or rods 91 are fixed to the sides of the members 86 in the manner of and for the same purpose as the wires 53 of FIG. 11. As seen in FIGS. 13 and 14, the ends of the deformable rods 85 are fixed to the member 86 between or inwardly of the reduced cross sectional hinge or flexure portions 93 of the member 86. By bending the rods 85 out of the general plane of the member 86, compensation for temperature induced zero-shift is obtained in the manner described in connection with FIG. 11.

The beam 86 is connected to one end of the armature 84 by a link 92 which extends through an aperture, not shown, in the member 87. The pickoff 80 has a sensitivity which decreases with an increase in temperature. The addition of the compensating means $Kc$ will, of course, provide the transducer with an overall stiffness which is temperature sensitive and will result in an armature displacement-input signal relationship which will not vary with temperature. Lastly, adjustable means 102 are provided to vary the preloading of the armature biasing spring 100 to effect zeroizing of the transducer.

It will be apparent that the compensating means $Kc$ of FIG. 12 could be combined with the pickoff 80 of FIG. 13, or that the compensating means $Kc$ of FIG. 13 could be combined with the force sensors of FIGS. 10 and 12. Further, it will be apparent that strain gages could be mounted on the beam 86 of the compensating means $Kc$ of FIG. 13 to provide a transducer similar to that of FIG. 11. Also, if desired, strain gages could be mounted on the armature 66 of FIG. 12 and the pivoted end of the armature made immovable whereby a transducer similar to that of FIG. 11 would be provided.

Figure 15:
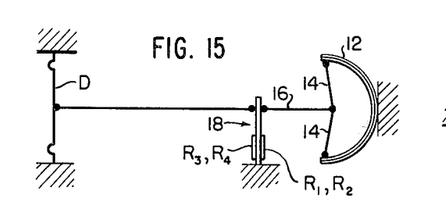
FIG. 15 is a diagrammatic representation of a fluid pressure transducer of the strain gage type incorporating the present invention.

All of the foregoing examples of transducers involve force sensing devices, and it may be necessary to modify the input signal in certain instances. For example, as shown in FIG. 15, if a bellows or diaphragm D is attached to the input of the sensor of FIG. 9, a pressure transducer will be provided. In practice, it would be desirable to use the same force sensor for various ranges of pressure, for example, from 0–1/10 p.s.i. or from 0–5000 p.s.i. By varying the diaphragm area, the range of the transducer may be varied somewhat; however, the amount of variation which can be achieved in this manner is quite limited. It is particularly difficult to provide a transducer which is such as shown in FIG. 15, which will have a range from 0–5000 p.s.i. and be accurate over the entire range. This is true because at very high fluid pressures, the diaphragm will, of practical necessity, be small and stiff. The stiffness of the diaphragm would in such a case be considerably greater than the stiffness of the sensor, and thus the displacement of the strain gage beam or the like will be almost entirely controlled by the movement of the diaphragm. Accordingly, the input to the force sensor will be a displacement rather than a force signal. Under such circumstances, the temperature compensation structure provided by this invention will not perform in the manner intended. Also, in the case of a small stiff diaphragm, its displacement per unit increase in pressure is so small that it is not particularly useful in connection with a strain gage transducer.

Figure 16:
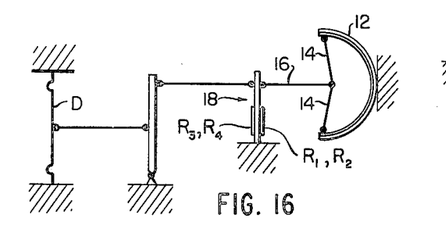
FIG. 16 is a diagrammatic representation of a pressure transducer similar to FIG. 15 but adapted for use in measuring relatively high pressures.
Figure 17:
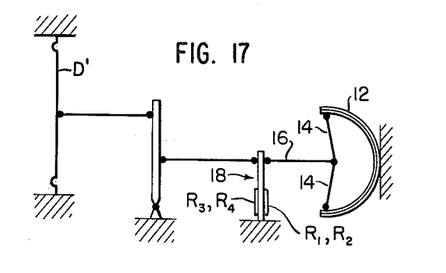
FIG. 17 is a diagrammatic representation of a pressure transducer similar to FIG. 15 but adapted for use in measuring relatively low pressures.

In accordance with this invention, we provide what will be called an impedance matching coupling between the diaphragm and the force sensor. With reference to FIG. 16, there is shown a high pressure transducer utilizing the diaphragm D and force sensor of FIG. 15. However, rather than being directly coupled as in FIG. 11, the diaphragm and force sensor are coupled by an impedance matching coupling comprising a lever system which, as viewed in the direction from the beam 18 to the diaphragm, is a displacement reducing linkage. Accordingly, the stiffness of the diaphragm, as viewed by the sensor, will be reduced. Correspondingly, the displacement of the diaphragm, as viewed by the sensor, will be increased. The end result is a temperature compensated strain gage transducer which will provide accurate indications of fluid pressure over a wide range to a very high pressure.

Where it is desired to provide a satisfactory transducer for very low pressures, the diaphragm D′, as shown in FIG. 17, will have substantially less stiffness than the diaphragm D of FIG. 16. Thus, the stiffness of the force sensor may be substantially greater than the stiffness of the diaphragm. Also, the displacement of the diaphragm is more than necessary. Accordingly, as shown in FIG. 17, the diaphragm D′ is coupled to the force sensor, by a lever system which, as viewed from the diaphragm D, is a displacement reducing linkage. The stiffness of the diaphragm, as viewed by the sensor, will thus be substantially increased while the displacement of the diaphragm, as viewed by the sensor, will be substantially decreased. Therefore, the pressure range that can be measured by the sensing element is substantially lowered without increasing the size of the diaphragm. Thus, there is provided a temperature compensated strain gage transducer for accurately measuring fluid pressures which are relatively low.

Figure 18:
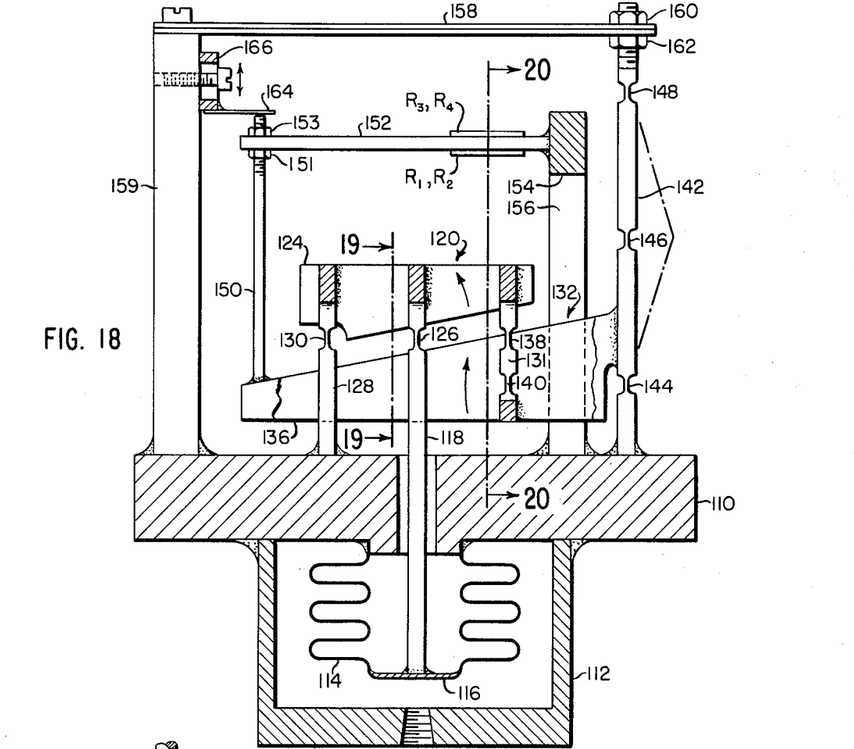
FIG. 18 is an elevational view of a preferred embodiment of a temperature compensated strain gage transducer of this invention.
Figure 19:
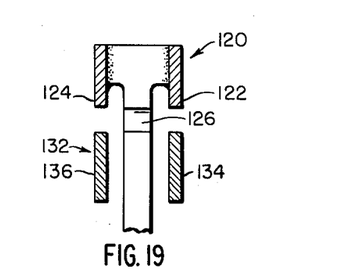
FIG. 19 is a cross sectional view along the line 19—19 of FIG. 18.
Figure 20:
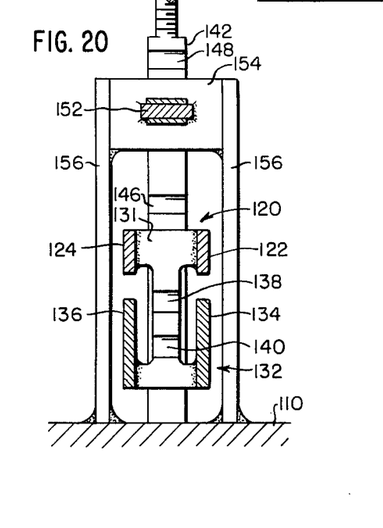
FIG. 20 is a cross sectional view along the line 20—20 of FIG. 18.

With reference to FIGS. 18 to 20, there is shown a practical embodiment of this invention, in the form of a strain gage transducer for converting a fluid pressure to an electrical signal. The transducer comprises a base 110 on the underside of which is mounted a housing 112 containing a bellows 114. One end of the bellows is fixed to the base 110 and the other end 116 is closed and spaced from the base 110. Changes in the pressure of the fluid introduced into the housing 112 and externally of the bellows will cause a displacement of the closed end 116 of the bellows toward and away from the base 112. The movable end 116 of the bellows is rigidly connected for movement with one end of a rod 118 which extends parallel to the line of action of the bellows and upwardly through an opening in the base 110. The other end of the rod 118 is rigidly connected to a lever 120 intermediate the ends of the lever. As shown in FIG. 19, the lever 120 comprises a pair of parallel spaced apart plate-like members 122 and 124 disposed on opposite sides of the rod 118. The rod 118 has a reduced cross sectional portion 126 adjacent the top thereof to provide a hinged connection between the ends of the rod 118. The portions of the rod on opposite ends of the pivot 126 may thus be said to be hingedly connected links. This permits pivotal movement of the lever 120 relative to the lower end of the rod 118 and about an axis extending at right angles to the line of action of the bellows 114.

The lever 120 extends generally parallel to the base 110, and the rightward end of the lever, as viewed in FIG. 18, is pivotally mounted on the base for movement about an axis extending parallel to the axis of the hinge 126. This pivotal mounting of the lever 120 is provided by a flexure member 128 which extends generally parallel to the rod 118. The upper end of the flexure member is disposed between the plates 122 and 124 and is rigidly connected thereto. The lower end of the flexure member is rigidly connected to the base 110. The flexure member is provided intermediate its ends with a reduced cross sectional portion 130 whereby the upper and lower ends of the flexure members are hingedly connected.

The end of the lever 120 opposite the flexure member 128 is connected by a flexure member 131 to a second lever 132 at a point intermediate the ends of the lever 132. The lever 132 extends parallel to the lever 120 and comprises a pair of parallel spaced apart plate-like members 134, 136, disposed on opposite sides of the flexures 118 and 128 spaced therefrom. As shown in FIGS. 18 and 20, the flexure 131 extends parallel to the flexures 118 and 128 and is rigidly connected at its opposite end to the plates 122, 124 and 134, 136. The flexure 131 is provided with a pair of reduced cross sectional portions 138 and 140 intermediate its ends which provide hinged connections having axes extending parallel to the axes of the hinge portion 130 of the flexure 128. The rightward end of the lever 132, as viewed in FIG. 18, is rigidly connected to an upright flexure member 142 mounted at its lower end on the base 110. The flexure 142 is provided with three reduced cross section portions 144, 146, and 148 spaced therealong and providing hinge connections having axes extending parallel to the axes of the hinge portions 138 and 140 of the flexure 131. It will be noted that the lever 132 is connected to the flexure 142 between the lower hinge portions 144 and the intermediate hinge portion 146.

The outer or left end of the lever 132 is connected to one end of a rod 150 which extends parallel to the flexure 142. The other end of the rod 150 is threaded and extends through an opening in the free end of a cantilever supported strain gage beam 152. A pair of adjusting nuts 151, 153 are mounted on the threaded end of the rod 150 and are engaged with opposite sides of the beam 152. The beam 152 extends in overlying relation and parallel to the levers 120 and 132 and the end thereof opposite the rod 150 is rigidly connected to a web 154 extending between a pair of vertical supports 156 mounted in the base 110. A pair of strain gages $R_1$, $R_2$, and $R_3$, $R_4$ are mounted on the opposite sides of the beam 152, so that when the beam 152 is deflected in a clockwise direction as viewed in FIG. 18, the gages $R_1$, $R_2$ will be in tension and the gages $R_3$, $R_4$ will be in compression.

Also mounted on the base 110 is a cantilever supported bimetal leaf spring 158 which extends parallel to the base in overlying relation and parallel to the strain gage beam 152. The end of the spring opposite the flexure 142 is rigidly mounted on a vertical support 159 which extends upwardly from the base 110. The other end of the spring 158 is provided with an opening through which the upper end of the flexure 142 extends. The upper end of the flexure 142 is threaded, and a pair of adjustment nuts 160 and 162 are mounted on the threaded end of the flexure and engaged with opposite sides of the spring 158.

In the operation of the transducer of FIGS. 18–20, the interior of the housing 112 is connected to the fluid, the pressure of which is to be measured. In the specific embodiment shown, an increase in the pressure of the fluid will result in an upward movement of the rod 118 so as to provide a counter clockwise tilting of the lever 132. Accordingly, the outer end of the beam 152 will be deflected upwardly and the resultant change in bridge voltage ratio of the gages $R_1$–$R_4$ will provide a measure of the fluid pressure. As can be seen in FIG. 18, the arrangement of the levers 120 and 132 and flexures 118, 128, 131, and 142 provides an amplification of the movement of the input rod 118. Thus, the transducer of FIG. 18 is adapted for use in the high fluid pressures. The pivotal movement of the lever 132 is permitted by the fact that when a counter clockwise force is exerted on the lever 132, the center pair of sections of the flexure between the hinge portions 144 and 148 will be deflected in the manner of a toggle, as shown in dotted lines in FIG. 18.

The temperature compensation of the transducer is provided by the temperature sensitive spring comprising the bimetal spring 158 and flexure 142. In the specific embodiment shown, the spring 158 exerts a downward force on the flexure 142, and the force of the spring increases with temperature. Thus, with a given input force on the flexure 118, a rise in temperature will cause spring 158 to tend to collapse the toggle links of the flexure 142 resulting in a tendency of the lever 132 to pivot counter clockwise about the hinged portions of the flexure 131. Thus, for a given input force on the flexure 118 there will be a greater deflection of the beam 152, or in other words, the stiffness of the transducer will be reduced.

The nuts 160 and 162 provide the means for adjusting the initial spring rate of the compensating means so that the sensitivity of the transducer will not vary with temperature. The nuts 151 and 153 provide the means for adjusting the effective length of the rod 150 and for eliminating zero-shift in the transducer output. In order to provide for zeroizing of the transducer a cantilever lead spring 164 is provided which is suitably fixed to the upper end of the rod 150 and biases the same in a direction longitudinally of the rod. The spring 164 is mounted on a bracket 166 which is mounted by a screw and slot mounting on the support 159. The bracket is thus adjustable longitudinally of the rod 150 so as to vary the direction and initial force exerted by the free end of the spring 164 on the rod 159 and thus the strain gage beam 152.

Thus, it can be seen that there has been provided a novel and improved means for providing a temperature compensated transducer wherein the temperature induced changes in sensitivity of the transducer are eliminated. A particular advantage of the transducer of this invention is that it eliminates the need for complex and costly electrical networks to compensate for changes in sensitivity of a strain gage bridge. Another particular advantage is that the use of this invention does not result in a reduction in the output of the transducer as may occur where electrical compensating networks are utilized. In fact, in the case of a strain gage transducer the output of the bridge of the transducer is often of sufficient magnitude that no amplification of the output is required.

As has been mentioned above, while this invention has been described in terms of specific examples and embodiments, it will be apparent to those skilled in the art that various changes and modifications might be made in the structures heretofore described without departing from the scope of the invention. Particularly, it has been shown that suitable compensating means other than that involving an actual spring can be provided to vary the mechanical stiffness of the transducer with temperature. Broadly speaking, however, any such compensating means can be described as spring means having a spring rate which varies with temperature. This is because such suitable compensating means will provide a force which varies as a function of displacement with the force having a rate of change as a function of displacement which varies with temperature.

In the preceding specific embodiments, with the exception of that of FIG. 12, the temperature compensating spring means includes an elongated deformable member which is laterally deformable out of the general plane thereof in response to changes in transducer input. The stiffness of said deformable member is varied with temperature by temperature responsive means which bias the deformable member with a force which varies with temperature and which is directed generally longitudinally of the deformable member in the general plane of the deformable member when in its undeformed condition. It will be apparent that it is also within the scope of the invention to utilize deformable members of other than elongated configurations. For example, a disc or flute-like member might be provided with the deforming force applied at right angles to the midpoint of the disc and with the temperature responsive means applying a force varying with temperature and acting radially of the disc at a plurality of points or completely around the disc.

Further, in the preceding description and accompanying drawings, the zero-shift compensation has been described in connection with means for varying the initial relative displacement of the compensating spring $Kc$ and the strain sensing member so that at zero applied force, the displacement of the strain sensing member will vary with temperature. While in the specific embodiments shown, this method of compensating for zero-shift is the preferred one, it will be appreciated that other means for compensating for zero-shift could be provided; for example, there might be provided a separate adjustable bimetal spring acting on the strain sensing member to provide a compensating force on, and consequently a deflection of, the strain sensing member in response to changes in temperature.

Lastly, it should be emphasized that while the present invention has been described and will be claimed in connection with a force sensing transducer, it will be understood that the end application of a force sensing transducer incorporating an invention might be the measurement of other than a simple force. For example, as previously shown, by providing a bellows or the like as an input device or pickup, a force sensing transducer may be utilized to measure fluid pressure; also by providing a spring or the like intermediate a movable element and a force sensing transducer, the transducer may be utilized to measure displacement; further by way of example, a force sensing transducer may be suitably modified or provided with a suitable pickup whereby acceleration forces may be measured by the transducer. Thus, it will be understood that the invention as described in the appended claims includes within its scope, force sensing transducers incorporating our novel temperature compensating means and which have been modified or combined with other structures to provide an overall transducer for sensing other than a force.

It is to be understood that the language in the following claims is intended to cover all of the generic and specific features of the invention herein described and all statements of the scope of the invention which, as a matter of language, might be said to fall therebetween.

We claim:

1. In a force sensing transducer of a type having a sensitivity which normally varies with temperature, having a deflectable member to which the input to the transducer is coupled so that the transducer output varies as a function of the deflection of said deflectable member: temperature compensating means for substantially eliminating temperature induced changes in transducer sensitivity providing a biasing force having a rate of change as a function of deflection of said deflectable member which varies with temperature; said compensating means being coupled to said deflectable member, thereby providing the transducer with a stiffness, with respect to deflection of said deflectable member, which varies as a function of temperature, a given temperature variation which produces an increase in the sensitivity of the transducer producing an increase in said stiffness, and means for adjusting the rate of change of said biasing force independently of temperature whereby the variation in sensitivity of the transducer with temperature may be compensated over extended temperature ranges.

2. In a force sensing transducer as described in claim 1, the means for coupling the input to the transducer to said deflectable member comprising an impedance matching linkage constructed and arranged to provide a force on and displacement of said deflectable member which are of values different from the force and displacement values of the input to the transducer.

3. In a force sensing transducer as described in claim 2, a base, said linkage including a pair of parallel levers, each of said levers being mounted for pivotal movement relative to the base by flexure members each having a reduced cross sectional portion intermediate the lever and the base, said levers being connected to each other lever by a flexure member having a pair of reduced cross section portions intermediate its ends, means connecting one lever to said deflectable member, and a flexure member having a reduced cross sectional portion fixed at one end to the other lever and adapted to be connected at its other end to the transducer input.

4. In a force sensing transducer of a type having a sensitivity which normally varies with temperature, having a deflectable member to which the input to the transducer is coupled so that the transducer output varies as a function of the deflection of said deflectable member: temperature compensating means for substantially eliminating temperature induced changes in transducer sensitivity providing a biasing force having a rate of change as a function of deflection of said deflectable member which varies with temperature; said compensating means being coupled to said deflectable member, thereby providing the transducer with a stiffness, with respect to deflection of said deflectable member, which varies as a function of temperature, whereby the variation in sensitivity of the transducer with temperature may be compensated over extended temperature ranges; and means for adjusting the initial stiffness of said compensating means at a reference temperature.

5. In a force sensing transducer of a type having a sensitivity which normally varies with temperature, having a deflectable member to which the input to the transducer is coupled so that the transducer output varies as a function of the deflection of said deflectable member: temperature compensating means for substantially eliminating temperature induced changes in transducer sensitivity providing a biasing force having a rate of change as a function of deflection of said deflectable member which varies with temperature and providing a biasing force which varies with temperature independently of deflection; said compensating means being coupled to said deflectable member, thereby providing the transducer with a stiffness, with respect to deflection of said deflectable member, which varies as a function of temperature, whereby the variation in sensitivity of the transducer with temperature may be compensated over extended temperature ranges.

6. In a force sensing transducer of a type having a sensitivity which normally varies with temperature, having a deflectable member to which the input to the transducer is coupled so that the transducer output varies as a function of the deflection of said deflectable member: temperature compensating means for substantially eliminating temperature induced changes in transducer sensitivity coupled to said deflectable member for substantially eliminating temperature induced changes in transducer sensitivity and temperature induced zero-shift in transducer output including means for biasing said deflectable member with a force which has a rate of change as a function of deflection of said deflectable member which varies with temperature and for biasing said deflectable member with a force which varies with temperature independently of deflection of said deflectable member; and means for adjusting said rate of change independently of temperature, whereby the variation in sensitivity of the transducer with temperature may be compensated over extended temperature ranges.

7. In a force sensing transducer of a type having a sensitivity which normally varies with temperature, having a deflectable member to which the input to the transducer is coupled so that the transducer output varies as a function of the deflection of said deflectable member: temperature compensating means coupled to said deflectable member for substantially eliminating temperature induced changes in transducer sensitivity and temperature induced zero-shift in transducer output including means biasing said deflectable member with a force which varies with temperature and which has a rate of change as a function of deflection of said deflectable member which varies with temperature; means for adjusting, at a reference temperature, the initial value of said rate of change; and means for providing at no load condition of the transducer a selected displacement of said compensating means.

8. In a force sensing transducer of a type having a sensitivity which normally varies with temperature, having a deflectable member to which the input to the transducer is coupled so that the transducer output varies as a function of the deflection of said deflectable member, and having a stiffness with respect to deflection of said deflectable member: temperature compensating means for substantially eliminating temperature induced changes in transducer sensitivity by varying said stiffness with temperature including a second deflectable member coupled to the first deflectable member; and temperature responsive means, including said second deflectable member, exerting on said first deflectable member a biasing force which, as a function of displacement of said first deflectable member by an input to the transducer, varies at a rate which varies with temperature.

9. In a force sensing transducer of a type having a sensitivity which normally varies with temperature, having a deflectable member to which the input to the transducer is coupled so that the transducer output varies as a function of the deflection of said deflectable member, and having a stiffness with respect to deflection of said deflectable member: temperature compensating means for substantially eliminating temperature induced changes in transducer sensitivity by varying said stiffness with temperature including a second deflectable member coupled to the first deflectable member; and temperature responsive means, including said second deflectable member, exerting on said first deflectable member a biasing force which varies with temperature and which, as a function of displacement of said first deflectable member by an input to the transducer, varies at a rate which varies with temperature; said temperature responsive means including means for varying said rate independently of temperature; and means for providing a selected initial deflection of said second deflectable member at the no load condition of the transducer.

10. In a force sensing transducer of a type having a sensitivity which normally varies with temperature, having a deflectable member to which the input to the transducer is coupled so that the transducer output varies as a function of the deflection of said deflectable member: temperature compensating means for substantially eliminating temperature induced changes in transducer sensitivity comprising, a deformable member coupled at an intermediate portion thereof to said deflectable member for deformation of said deformable member in a direction out of the general plane thereof in response to changes in transducer input, temperature responsive means acting on said deformable member in a direction extending in the general plane of said deformable member when it is undeformed and at a value which varies with temperature thereby providing the deformable member with a stiffness which varies with temperature, and means to adjust the force provided by said temperature responsive means independently of temperature.

11. In a force sensing transducer of a type having a sensitivity which normally varies with temperature, having a deflectable member to which the input to the transducer is coupled so that the transducer output varies as a function of the deflection of said deflectable member: temperature compensating means for substantially eliminating temperature induced changes in transducer sensitivity comprising, an elongated member which is laterally deformable, means coupling said deflectable member to the deformable member intermediate the ends thereof whereby deflection of said deflectable member by an input to the transducer will result in lateral deformation of said deformable member, temperature responsive means for applying to at least one end of said deformable member a force varying with temperature and directed generally longitudinally of said deformable member whereby the stiffness of said deformable member with respect to lateral deformation and thus the stiffness of the transducer varies with temperature, and means for selectively adjusting the value of said force on the deformable member independently of temperature to vary the initial stiffness of said deformable member and thus of the transducer at a reference temperature.

12. In a force sensing transducer of a type having a sensitivity which normally varies with temperature, having a deflectable member to which the input to the transducer is coupled so that the transducer output varies as a function of the deflection of said deflectable member: temperature compensating means for substantially eliminating temperature induced changes in transducer sensitivity comprising, an elongated member which is laterally deformable, means coupling said deflectable member to the deformable intermediate the ends thereof whereby deflection of said deflectable member by an input to the transducer will result in lateral deformation of said deformable member, temperature responsive means for applying to at least one end of said deformable member a force varying with temperature and directed generally longitudinally of said deformable member whereby the stiffness of said deformable member with respect to lateral deformation and thus the stiffness of the transducer varies with temperature, and means for selectively adjusting the value of said force on the deformable member independently of temperature to vary the initial stiffness of said deformable member and thus of the transducer at a reference temperature, and means for providing a selected initial displacement of said deformable member under a no load condition of the transducer.

13. In a force sensing transducer of a type having a sensitivity which normally varies with temperature, having a deflectable member to which the input to the transducer is coupled so that the transducer output varies as a function of the deflection of said deflectable member: temperature compensating means for substantially eliminating temperature induced changes in transducer sensitivity comprising, an elongated member which is laterally deformable, coupling means connecting said deflectable member to the deformable intermediate the ends thereof whereby deflection of said deflectable member by an input to the transducer will result in lateral deformation of said deformable member, temperature responsive means for applying to at least one end of said deformable member a force varying with temperature and acting generally longitudinally of said deformable member whereby the stiffness of said deformable member with respect to lateral deformation and thus the stiffness of the transducer varies with temperature, means for selectively adjusting the value of said force acting on the deformable member independently of temperature, to vary the initial stiffness of the transducer at a reference temperature, and means for selectively adjusting the effective length of said coupling means.

14. In a force sensing transducer of a type having a sensitivity which normally varies with temperature, having a deflectable member to which the input to the transducer is coupled so that the transducer output varies as a function of the deflection of said deflectable member: temperature compensating means for substantially eliminating temperature induced changes in transducer sensitivity comprising, a toggle-like structure, said deflectable member being coupled to said toggle-like structure for movement therewith in response to movement of the toggle-like structure toward and away from on center condition, temperature responsive means exerting longitudinally of said toggle-like structure a force which varies with temperature, and means for adjusting the value of said force independently of temperature.

15. In a transducer as described in claim 14, said toggle-like structure comprising an elongated member having a plurality of reduced cross section portions spaced apart therealong to provide a plurality of links connected by hinge-like portions.

16. In a force sensing transducer of a type having a sensitivity which normally varies with temperature, having a deflectable member to which the input to the transducer is coupled so that the transducer output varies as a function of the deflection of the deflectable member: temperature compensating means for substantially eliminating temperature induced changes in transducer sensitivity comprising, a toggle-like structure, said deflectable member being coupled to said toggle-like structure for movement therewith in response to movement of the toggle-like structure toward and away from on center condition, temperature responsive means exerting longitudinally of said toggle-like structure a force which varies with temperature, means for adjusting the value of said force independently of temperature, and adjustable means for providing a selected initial displacement of said toggle-like structure out of on center condition at no load condition of the transducer.

17. In a force sensing transducer of a type having a sensitivity which normally varies with temperature, having a deflectable member to which the input to the transducer is coupled so that the transducer output varies as a function of the deflection of said deflectable member: temperature compensating means for substantially eliminating temperature induced changes in transducer sensitivity comprising, an elongated member which is laterally deformable, means coupling said deflectable member to the deformable intermediate the ends thereof whereby deflection of said deflectable member by an input to the transducer will result in lateral deformation of said deformable member, and temperature responsive means for applying to at least one end of said deformable member a force varying with temperature and acting generally longitudinally of said deformable member to tend to vary the spacing of the ends of said deformable member, means for selectively adjusting the value of said force independently of the temperature, and adjustable means for selectively varying the relative distribution of mass of said deformable member on the opposite sides of the longitudinal centerline thereof in the direction of lateral deformation thereof.

18. In a transducer as described in claim 17, the last mentioned means comprising a pair of deformable elements on the deformable member extending generally laterally of the direction of and being deformable generally in the direction of the lateral deformation of said deformable member.

19. In a force sensing transducer of a type having a sensitivity which normally varies with temperature, having a first deflectable member to which the input to the transducer is coupled so that the transducer output varies as a function of the deflection of said deflectable member: temperature compensating means for substantially eliminating temperature induced changes in transducer sensitivity comprising a second deflectable member coupled to the first deflectable member for movement therewith, and magnetic means providing a pair of poles disposed in spaced relation on opposite sides of said second deflectable member in the direction of movement thereof, said magnetic means further including temperature responsive means for varying the strength of the magnetic field between said poles.

20. In a force sensing transducer of a type having a sensitivity which normally varies with temperature, having a deflectable member to which the input to the transducer is coupled so that the transducer output varies as a function of the deflection of said deflectable member: temperature compensating means for substantially eliminating temperature induced changes in transducer sensitivity comprising, an elongated member which is laterally deformable, means coupling said deflectable member to the deformable intermediate the ends thereof whereby deflection of said deflectable member by an input to the transducer will result in lateral deformation of said deformable member, temperature responsive means for applying to at least one end of said deformable member a force varying with temperature and directed generally longitudinally of said deformable member to vary the stiffness thereof with temperature, said temperature responsive means including means having a temperature coefficient of expansion which is substantially different from that of said deformable member and coupled to said deformable member at points spaced apart longitudinally thereof so that temperature induced differential expansion between the last mentioned means and said deformable member will provide said force, said last mentioned means further including means for varying the value of said force independently of temperature.

21. In a force sensing transducer of a type having a sensitivity which normally varies with temperature, having a deflectable member to which the input to the transducer is coupled so that the transducer output varies as a function of the deflection of said deflectable member: temperature compensating means for substantially eliminating temperature induced changes in transducer sensitivity comprising, an elongated member which is laterally deformable, means coupling said deflectable member to the deformable intermediate the ends thereof whereby deflection of said deflectable member by an input to the transducer will result in lateral deformation of said deformable member, a pair of resilient elongated members disposed on opposite sides of said deformable member and aligned in the direction of lateral deformability thereof, the ends of said resilient members being fixed to said deformable member adjacent the ends thereof and being spaced from said deformable member intermediate the ends, said resilient members having a temperature coefficient of expansion which is different from that of the deformable member, and adjustable means for varying the relative spacing of the intermediate portions of said resilient members to provide, at a reference temperature, a selected initial force directed longitudinally of said deformable member.

22. In a transducer as described in claim 21, means for varying the relative distribution of mass of said deformable member on the opposite sides of the longitudinal centerline thereof in the direction of lateral deformation.

23. In a transducer as described in claim 22, the last mentioned means including a pair of deformable elements on the deformable member extending generally laterally of and deformable generally in the direction of the lateral deformation of said deformable member.

24. In a force sensing transducer of a type having a sensitivity which normally varies with temperature, having a deflectable member to which the input to the transducer is coupled so that the transducer output varies as a function of the deflection of said deflectable member: temperature compensating means for substantially eliminating temperature induced changes in transducer sensitivity comprising, an elongated member which is laterally deformable, means coupling said deflectable member to the deformable intermediate the ends thereof whereby deflection of said deflectable member by an input to the transducer will result in lateral deformation of said deformable member, a pair of outwardly bowed elongated resilient members disposed on opposite sides of said deformable member and aligned in the direction of lateral deformation thereof, the ends of said bowed members being fixed to said deformable member adjacent its ends, said bowed members being fabricated from a material having a temperature coefficient of expansion different from that of said deformable member, means for adjusting the spacing of the midsections of said bowed members relative to each other, and a pair of deformable elements extending from the opposite sides of said deformable member and generally laterally of the direction of deformation of said deformable member, said elements being deformable in the same direction and generally toward one or the other of said bowed members to provide an initial deformation of said deformable member at no load condition of the transducer.

25. In a strain gage transducer having a mechanical stiffness which varies with temperature, the output of said transducer for a given input varying with variations in said stiffness, temperature sensitive spring means for varying the mechanical stiffness of the transducer in response to changes in temperature to substantially eliminate temperature induced changes in transducer sensitivity, a given temperature variation which produces an increase in the sensitivity of said transducer producing an increase in said mechanical stiffness, and means for adjusting the spring rate of said spring means independently of temperature, whereby the variation in sensitivity of the transducer with temperature may be compensated over extended temperature ranges.

26. In a strain gage transducer having a mechanical stiffness which varies with temperature, the output of said transducer for a given input varying with variations in said stiffness, said transducer comprising a piezo resistive element deflectable in response to changes in transducer input, the sensitivity of said element varying with variation in temperature, temperature sensitive spring means coupled to said piezo resistive element and varying the mechanical stiffness of the transducer in response to changes in temperature to substantially eliminate temperature induced changes in transducer sensitivity, a given temperature variation which produces an increase in the sensitivity of said element producing an increase in said mechanical stiffness, means for adjusting the spring rate of said spring means independently of temperature, whereby the variation in sensitivity of the transducer with temperature may be compensated over extended temperature ranges, and means for providing a selected initial displacement of said spring means at transducer no load condition.

27. In a strain gage transducer having a mechanical stiffness which varies with temperature, the output of said transducer for a given input varying with variations in said stiffness, said transducer comprising a member which is deflectable in response to changes in transducer input and a strain gage connected to said deflectable member for deflection therewith, temperature sensitive spring means coupled to said deflectable member and varying the mechanical stiffness of the transducer in response to changes in temperature to substantially eliminate temperature induced changes in transducer sensitivity, a given temperature variation which produces an increase in the sensitivity of said strain gage producing an increase in said mechanical stiffness, means for adjusting the spring rate of said spring means independently of temperature, whereby the variation in sensitivity of the transducer with temperature may be compensated over extended temperature ranges, and means for adjusting the effective length of the coupling between said spring means and said deflectable member.

References Cited by the Examiner

UNITED STATES PATENTS

| | | | |
|---|---|---|---|
| 1,300,141 | 4/1919 | Dunn | 177—228 |
| 1,665,322 | 4/1928 | Patrick | 73—497 |
| 2,161,743 | 6/1939 | Hienrich et al. | |
| 2,235,314 | 3/1941 | Diggins et al. | 73—362.4 X |
| 2,236,158 | 3/1941 | Rockefeller | 177—228 |
| 2,357,356 | 9/1944 | Petty | 73—382 |
| 2,662,757 | 12/1953 | Mock | 73—345 X |
| 2,681,566 | 6/1954 | Ruge | 73—141 |
| 2,739,835 | 3/1956 | Dolza et al. | 73—362.5 |
| 2,930,227 | 3/1960 | Spademan et al. | 73—141 |
| 2,939,317 | 6/1960 | Mason | 73—88.5 |
| 2,949,775 | 8/1960 | Newbold | 73—141 X |
| 3,023,627 | 3/1962 | Geyling | 73—88.5 |
| 3,091,961 | 6/1963 | Piell | 73—141 |

RICHARD C. QUEISSER, *Primary Examiner.*

CHARLES A. CUTTING, ROBERT EVANS,
*Examiners.*